(12) United States Patent
Dickerson

(10) Patent No.: US 6,697,730 B2
(45) Date of Patent: *Feb. 24, 2004

(54) COMMUNICATIONS AND COMPUTING BASED URBAN TRANSIT SYSTEM

(75) Inventor: Stephen L. Dickerson, Atlanta, GA (US)

(73) Assignee: Georgia Tech Research Corp., Atlanta, GA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/826,272

(22) Filed: Apr. 4, 2001

(65) Prior Publication Data

US 2001/0037174 A1 Nov. 1, 2001

Related U.S. Application Data

(60) Provisional application No. 60/273,286, filed on Mar. 1, 2001, and provisional application No. 60/194,416, filed on Apr. 4, 2000.

(51) Int. Cl.[7] ................................................. G06F 7/00
(52) U.S. Cl. ..................... 701/200; 73/178 R; 340/907; 340/908; 342/352
(58) Field of Search ................................ 701/200, 201; 73/178 R; 340/907, 908, 993, 994; 342/352; 705/400

(56) References Cited

U.S. PATENT DOCUMENTS

| | | | |
|---|---|---|---|
| 4,220,946 A | * 9/1980 | Henriot | 340/994 |
| 5,187,810 A | 2/1993 | Yoneyama et al. | |
| 5,493,295 A | 2/1996 | Lewiner et al. | |
| 5,623,260 A | * 4/1997 | Jones | 340/994 |
| 5,657,010 A | * 8/1997 | Jones | 340/994 |
| 5,668,543 A | * 9/1997 | Jones | 340/994 |
| 5,739,774 A | 4/1998 | Olandesi | |
| 5,799,263 A | 8/1998 | Culbertson | |
| 5,818,356 A | 10/1998 | Schuessler | |
| 5,867,780 A | * 2/1999 | Malackowski et al. | 455/414 |
| 5,987,377 A | 11/1999 | Westerlage et al. | |
| 6,006,159 A | 12/1999 | Schmier et al. | |
| 6,085,976 A | * 7/2000 | Sehr | 235/384 |
| 6,313,760 B1 | * 11/2001 | Jones | 340/994 |
| 6,363,488 B1 | * 3/2002 | Ginter et al. | 713/201 |
| 6,397,057 B1 | * 5/2002 | Malackowski et al. | 455/414 |
| 6,411,803 B1 | * 6/2002 | Malackowski et al. | 455/406 |

* cited by examiner

Primary Examiner—William C. Cuchlinski, Jr.
Assistant Examiner—Olga Hernandez
(74) Attorney, Agent, or Firm—Thomas, Kayden, Horstmeyer & Risley LLP; Todd Deveau

(57) ABSTRACT

A communications and computing based urban transit system based on digital cellular communication, GPS locating technology, and digital computers to provide real-time command and control of passengers and vehicles with the objective of minimizing the social costs of urban transportation.

6 Claims, 9 Drawing Sheets

COMMUNICATIONS AND COMPUTING BASED URBAN TRANSIT SYSTEM

CROSS REFERENCE

This application claims priority to a provisional patent application U.S. Ser. No. 60/273,286 entitled "Communications and Computing Based Urban Transit System" filed on Mar. 1, 2001, and to U.S. Ser. No. 60/194,416 entitled "Communications and Computing Based Urban Transit System" filed on Apr. 4, 2000.

BACKGROUND OF THE INVENTION

1. Field of the Invention

The present invention generally relates to an automated transit system, and more particularly to an urban transit system that minimizes the social costs of urban transportation, the transit system being based on digital cellular communication, GPS locating technology and digital computers to provide real-time command and control of passengers and vehicles.

2. Description of Related Art

For a number of reasons, the vast majority of communities in the United States and in many other geographic regions have grown to rely on individual transportation, (transportation through individually owned automobiles or cars), rather than public or mass transit. Nowhere is this more evident than in the Atlanta, Ga. area, where traffic congestion and air pollution are fast becoming critically major concerns.

The growing reliance on individual transportation raises a number of very serious concerns. One of the most serious problems is the environmental damage caused by traditional individual transportation vehicles that are powered by internal combustion engines. Internal combustion engines release pollutants into the atmosphere causing air pollution. Individual transportation vehicles also leak lubricants and other environmentally-detrimental chemicals along roadways and parking areas. Such pollutants periodically are washed away by rain water and pollute soils, ground waters, lakes, and rivers. Furthermore, routine maintenance of an individual transportation vehicle contributes huge quantities of pollutants, including used motor oil, which pollutants commonly are not properly handled or recycled.

Other costs related to traditional individual transportation exist beyond those of the environmental costs. With no viable public transportation in many areas, a family generally must own and maintain multiple vehicles. Additionally, the largest monthly expense for many families is the cost of acquiring and operating motor vehicles. Repair costs and insurance add to the financial burdens associated with individual transportation vehicles. Personal injury related costs related to the operation of individual transportation vehicles must also be considered a cost of the conventional individual transportation system. Further, in addition to a family's expenses of owning, operating and maintaining individual transportation vehicles, the costs of building and maintaining roads, highways and the infrastructure required for individual transportation vehicles represent a significant drain on public funds. Yet, an area's infrastructure rarely keeps pace with population increases, and, thus, there is large social cost associated with invariable congestion delays resulting from inadequate infrastructure.

The infrastructure that is required for a successful individual transportation system is unavailable, so this conventional system cannot efficiently operate. For example, retail establishments and business centers necessitate substantial spacing to accommodate parking for cars. This required spacing for the cars, combined with the low population density of urban and suburban areas that cars accommodate, make traditional mass transit systems simply too inefficient to be competitive.

Traditional mass transit systems include buses operating on fixed routes as well as light rail and regular rail systems. Where rail systems are in place in relatively high population density areas, the systems commonly enjoy very high ridership. However, the cost of installing rail systems effectively prohibits their use in many areas. Furthermore, low population density urban and suburban areas can not be efficiently serviced by rail systems alone. Even if a rail system provided a link between a suburban area and a downtown area, for example, users must still find some way to travel from their residence to a rail station and from a downtown terminal to their final downtown destination.

Further, transit systems that incorporate buses that operate on fixed routes have proven simply too inefficient to compete with automobile transportation. One reason for this inefficiency is that fixed bus routes are so tied to traffic that it is virtually impossible to maintain a satisfactory schedule. Furthermore, large buses operating on heavily traveled roads interfere with automobile traffic.

In the low population density urban and suburban areas, fixed bus routes and schedules must be so widely spaced that it is difficult and inconvenient for people to even reach the nearest bus stop. Transfers between routes are also difficult to coordinate. The fact of the matter is that traditional fixed route bus transportation systems are so inefficient that for the most part only those who must use the system for economic reasons actually use and benefit from the system. Aside from the general inconvenience of a traditional bus system, the travel time required by such systems is commonly so high that many potential users cannot even consider using the mass transit system without changing lifestyles significantly. Further, passenger use of conventional mass-transit or ride-sharing leaves that person without the use of a private car, often the only practical alternative for errands and emergencies.

Several transit systems are known, but all have disadvantages and deficiencies addressed and overcome by the present system. Such systems include U.S. Pat. No. 5,187,810 to Yoneyama et al. ('810); U.S. Pat. No. 5,493,295 to Lewiner et al. ('295); U.S. Pat. No. 5,739,774 to Olandesi ('774); U.S. Pat. No. 5,799,263 to Culbertson ('263); U.S. Pat. No. 5,818,356 to Schuessler ('356); U.S. Pat. No. 5,987,377 to Westerlage et al. ('377); and, U.S. Pat. No. 6,006,159 to Schmier et al. ('159).

Advances in communications heretofore neglected by mass transit systems can provide a suitable framework that can radically change the economy of mass transit. Primarily, wireless technology and computing make it feasible to provide massive substitutions of information technologies for hardware (road, cars, rails, and trains), and energy (gasoline and coal).

In an attempt to apply the communications revolution presently underway to the problems of an attractive mass transit system, the inventor has relied on some engineering fundamentals that apply to nearly every city transit system, and particularly to the Atlanta area. For example, it is evident that existing roads must provide the bulk of all transport. Further, the capacity of a lane of freeway or arterial street is nearly proportional to vehicle occupancy. High occupancy vehicle lanes and other high occupancy privileges result in time savings for high occupancy vehicles, and are an efficient use of resources when demand is sufficient.

As a result of the improvements in communications, presently it is inexpensive to communicate to and from people, vehicles, and traffic controls nearly in real-time; that is, with delays measured in seconds. It also is inexpensive today to track the geographic position of all vehicles used in high-occupancy transit in real-time. Additionally, it is inexpensive to process data at a central facility, in a plurality of vehicles and in hand-carried devices. Central facility herein does not imply location in a single geographic location, only a function of assigning and coordinating activities. Finally, the social cost of the driving function on a trip that would otherwise be made by the driver is negligible relative to the cost of a paid driver.

As used throughout, hand-carried devices principally refer to cellular phones, radio-capable personal digital assistants, and two-way pagers. "Hand-held devices" and "cell phones" are terms used interchangeably herein.

There are many trips for which there is no practical substitute for an individually driven automobile. In a metropolitan areas like Atlanta, there is rarely a shortage of convenient automobiles for individual trips, only a shortage of access to the use of those automobiles. Conventional ride-sharing and bus-rail transit have poor performance relative to the expectations of the public, primarily because of the perceived extensive total travel time and uncertainty in the trip time (mainly a function of uncertainty in vehicle arrival times). Conversion of single passenger auto trips during employment rush hours to mass-transit generally has the greatest social benefit.

From the above observations regarding prior art transit systems and the current state of communication systems and engineering fundamentals, it is apparent that a system of mass-transit that is information intensive is key to the resolution of public transportation problems. It is to the provision of such an urban transit system that the present invention is primarily directed.

SUMMARY OF THE INVENTION

Accordingly, the present communications and computing based urban transport system comprises a central assigning system and communications devices adapted to be associated with vehicles for transmitting information from the vehicles to the central assigning system, and for receiving information from the central assigning system. The transit system preferably integrates mass transit needs by providing wireless communications between the passengers of the transit system, the vehicles, and the central assigning system used to move the passengers between particular origination and destination sites. In one aspect of the invention, an automated transit system capable of utilizing transit capabilities to transport a passenger from an origination to a destination is provided comprising: a central assigning system capable of matching a passenger's trip request with current transit parameters to determine vehicle assignment and routes that reduce passenger trip and wait times, wherein the current transit parameters and passenger location are obtained via wireless communication devices optionally capable of transmitting location data.

The passengers and vehicles also are linked to the central assigning system in order to optimize efficiencies in moving the passengers between the origination and destination. The complexity of the present transit system increases with increases in the number of passengers, the number of origination and destination sites involved, and the number and types of vehicles used.

The present transit system equips the passengers and vehicles with wireless communication devices that transmits information to, and receive information from, the central assigning system. The central assigning system is capable of maximizing efficiencies in urban transportation with the information received from and sent to the passengers and vehicles. The system provides passengers with the greatest flexibility and convenience consistent with relatively low economic and environmental costs through the use of wireless communications to and from passengers, vehicles and the central assigning system.

Each passenger of the system requests a "trip" be made using the transit system. A trip is defined for each passenger, each trip comprising the origination and destination points for each particular individual. It will be understood that several passengers of the amount of total passengers may request trips having identical, or nearly identical origination sites, and/or identical, or nearly identical destination sites. It is an object of the present invention to minimize resources and costs associated with transporting the passengers between the various sites.

The term passenger herein defines an individual, or group of individuals, that require(s) transportation from a particular origination site to a particular destination site, wherein the mode of transportation is through the use of a vehicle.

The vehicles of the present transit system include both "shared-ride vehicles", for example, rail transit, buses, vans, and multi-occupancy cars (vehicles used to carry more than one passenger), and "shared vehicles" for individual trips (vehicles used to carry a single passenger). It will be understood that "shared-ride vehicles" may be referred to herein as both "transit" and "ride-sharing". Similarly, "shared vehicles" may be alternately referred to as "car rental". One aspect of the present transit system is the availability of car rental vehicles in congested areas at costs and delay times similar to those associated with using a private auto.

All vehicles except possibly automated rail vehicles have drivers. There are two categories of drivers, those who are also passengers and those who are professional. In the case of vans, multi-occupancy cars, and car rentals, the driver is also making a productive trip, thus the social cost of driving itself is zero or nearly zero. These drivers are referred to as shared-ride drivers or rental drivers herein. Professional drivers would normally be used for urban transit buses and rail vehicles. They receive no benefit from making the trip except payment of wages, and benefits. It is possible that professional drivers would be used occasionally to reposition rental vehicles and ride-sharing vans and cars, but the usual driver would be a passenger. Similarly, it is possible that ride-sharing drivers would be used for full size buses, since this reduces labor costs. The present system helps make the latter more feasible.

Communication devices are used in a number of ways, for example: (1) to connect passengers with the central assigning system; (2) to connect drivers with the central assigning system; (3) to connect vehicles with the central assigning system; (4) to connect the various elements of the central assigning system to one another; and, (5) to connect the passenger to vehicles at short range.

Communication devices falling under items 1 and 2 above (used for interfacing the passengers and vehicles with the central assigning system) include, among others, digital cellular communications such as cell phones and GPS (global positioning system) locating technology. The communication devices of item 3 are indicated under the description under the central assigning system.

Preferably, the communication devices of items 1 and 2 are wireless communications enabling the wireless interconnectivity of passenger and vehicle. Other communication devices of items 1 and 2 can include land line communications, such as, phone, E-mail, and World Wide Web technologies. For ease of description only, wireless communication devices herein will be collectively referred to as cell phones. It should be understood that the wireless communcation devices need not be limited to cellular phones. Similarly the term GPS refers to wireless locating technology that may be based on cellular locating systems known to those skilled in the art.

For communication devices of item 5, passenger communication devices can be provided with low transmit power on request to identify the person (if enabled) so as to be able to tell who is in a vehicle or using a rental car. This ability can also be used to enable a rental car, and to identify who is, was, or is about to be on a ride-sharing vehicle. A more general use of low power communication device transmission can be identifying the passenger for purposes of remotely opening doors and enabling ignition. This ability is somewhat similar to current hand-held opening devices used as key chains and garage door openers. Conventional cell phones do not typically have such a feature, but this invention anticipates future incorporation for participating passengers as more convenient than a separate device. Another beneficial feature of the present communication devices (that is often not a part of conventional cell phones) is a USB (universal serial bus) or similar connection such as the low power communication device just referenced, that enables both communication with and power from an attached PC. This will be referred to later to enable special PC and cell phone interactions. The same low power transmission capability of item 5 permits automatic billing of passengers in ride-shared vehicles including mass-transit, and in rental cars. The ridership information so provided to the vehicles is then relayed to the central assigning system discussed next and used to maintain billing information for each passenger. It is a great convenience not to need to make payment by cash, tokens, or credit cards each time a trip or segment of trip is made. Rather a periodic billing is made, perhaps monthly as part of the cellular communications bill. In a similar manner, ride-sharing drivers, particularly of privately owned cars and vans, can be compensated in an automated manner for the services they perform by such mechanisms as automatic deposit. The compensation of such drivers would likely depend in part on the number or passengers they carry as well as the number of times they were available for assignment and mileage driven. All of this can be handled in a fully automatic manner.

The central assigning system of the present transit system includes an assembly of digital computers and communication devices, for example, modems. Modems are used to connect the computers of the central assigning system to phone lines, including particularly high speed versions such as DSL and T1, and to dedicated high speed lines like fiber optics. This in turn provides the links between discrete computers of the central assigning system, and between the communication devices of passengers and vehicles with the central assigning system. The latter takes advantage of the existing cellular (or other) wireless communication system.

The central assigning system need not be located at a single/central location. In preferred embodiments of the present transit system, portions of the assigning system are distributed among several locations to take advantage of the geographic nature of its customers. That is, passengers and shared-ride vehicles are likely to be distributed by geography, and it may well be that distributed location of computers results in lower overall cost.

The integration of passengers with vehicles, communication devices and the central assigning system according to the present transit system provides real-time command and control of passengers and vehicles while minimizing the social costs of urban transportation. Social costs include such things as trip times and convenience, economic costs, and pollution. Most notably, the present transit system has total economic and social costs that are much less than those associated with conventional mass transit systems that incorporate simply an expanded system of roads and conventional mass transit.

The present transit system provides other advantages over the prior art including, among others, the ability to make trip time uncertainty (including waiting times), on the order of a few minutes. Further, the transit system is capable of making total trip times comparable to, if not less than, those of private auto for many employment, shopping and recreational trips. These advantages are particularly beneficial as one impediment to the public's acceptance of an urban transportation system is the public's quite correct observations that total trip times are less when using the family's private vehicle, so why submit to the inevitable uncertain waiting times and greater total transit times of conventional mass transit systems.

The preferred transit system has passengers register for standard trips that are associated with defined origination sites, destination sites and trip times. For example, an "employment trip" can be defined as: inbound between 6 AM and 10 AM; use of one of three pickup locations (origination sites) in a defined residential area; use of a single employment location (destination site); and, be outbound between 1 PM and 8 PM. This employment trip would be assigned a code referred to later that would be used to provide single button requests on a cellular phone. The registration could be via a web page to eliminate the need for operator interaction with the subscriber.

The passenger submits this "employment trip" request via the passenger cell phone to the central assigning system. The central assigning system has accumulated historical employment trip information from a plurality of passengers, and predicts the optimal timing of origination sites and destination sites for the passengers. (For conventional mass transit, this is the schedule of vehicle operations but updated by actual operations with GPS information) For ride-sharing with a ride-sharing driver, this schedule can be adjusted day to day to take advantage of and account for numerous possibilities including driver illness and demand changes by day of week or because of holidays.

When a passenger requests service, the central assigning system immediately assigns the passenger to one or more alternative anticipated routings and communicates the alternatives to the passenger. Such processing may include defining more than one origination and/or destination site, and more than one vehicle. The passenger then picks one of the alternatives based on timing and locations of origination and destination, and perhaps cost. At this point, the passenger's employment trip request becomes a "reservation" held in the system. Thereafter, assuming a particular vehicle has become fully loaded with passengers having reservations, future requests from other passengers will not be assigned to that particular vehicle.

In assigning passengers, that is, providing alternative routings, the central assigning system interprets various data, including the method by which the passenger is to arrive and depart from the pick-up and drop-off site. For example, if the passenger profile indicates walking was to be used for getting to and from home, the answer would be different than if a car was available to drive to a pick-up site.

The central assigning system can dynamically update the schedule of vehicles based both on demand trends and on actual vehicle progress in meeting schedules. Vehicle progress data can be provided by GPS. Some or all of the ride-sharing drivers as well as all of the paid bus drivers, and all rail schedules, are presumed to have some flexibility in making trips. This is obvious for standard transit, although under current situations most operate on fixed time schedules because passengers are without cell phones according to the present system, and must depend on portable time pieces (watches) and predetermined, but perhaps unreliable, schedules.

Ride-sharing drivers have essentially the same portable communication devices as passengers, e.g., cell phones, but the software capabilities are slightly different. For most drivers, there is a fixed window of making trips. For example, driver A may make employment trips and is required to arrive between 8 AM and 8:30 AM and work at least an 8 hour day with prearranged flexibility to stay 8 to 9 hours at the work location. The assigning system communicates with the driver and assigns him or her to arrange the trip based on the same considerations as discussed earlier.

It is anticipated that some ride-sharing drivers may have a fixed schedule that cannot be altered. In such a case, the financial reward to the driver may be less favorable than for someone with more flexibility.

As noted above, the assigning system accounts for alternatives including driver's illness, vacations, and other exceptions. The assigning system can handle these contingencies, preferably totally automatically, by such actions as (1) simply not using the vehicle, (2) by calling in a back up driver (who would normally have been a passenger perhaps), (3) by adjusting the rest of the vehicle schedules, or (4) in emergencies, notifying already scheduled passengers that service is not available and allowing them to reenter the system. As discussed later, a contemplated billing subsystem can automatically take into account such failures of service.

One embodiment of the central assigning system incorporates the use of a scheduling processor/subsystem. The scheduling processor of the central assigning system systematically monitors each passenger's and vehicle's information, and then communicates to the passenger a pickup point (origination site) and estimated or exact time of pick up. The scheduling processor can further inform the passenger of the type of vehicle, the exact destination site (if not fixed by the request), the expected time of arrival, the cost of the trip (if not fixed and requested as part of the passenger profile), and the expected total time of travel. More than one communication may be required to update information, particularly the exact time of trip origination. This will allow the passenger to originate his departure from home, office, store, etc. at a time that minimizes waiting time. Waiting time for trips is known to have a particularly high social penalty for passengers. Similarly, uncertainty of times has a particularly high social penalty.

The data interpreted and evaluated by the central assigning system can include: (1) communications with passengers to schedule their trips and give them precise information on trip times and sites; (2) vehicle (and in some instances passenger) location communications using GPS technology; (3) communications to vehicles to allocate routes, schedules and passengers; and, (4) communications between passengers and vehicles to monitor system usage. These communications pertain to both ride-sharing and vehicle rental. Under normal operations, digital computers monitor and control the system without manual intervention so as to both minimize costs and make the complex data processing possible in a timely manner.

Accordingly, it is a general object of the invention to provide a public transit system that overcomes the above-described problems and others associated with prior public transit systems.

It is another object of the present invention to utilize the existing mass transit infrastructure while supplementing it with advanced communication technology in order to provide a superior transit system.

It is another object of the present invention to provide a more efficient and effective route assignment process that minimizes vehicle backtracking and makes the most efficient use of the vehicles which service transit requests.

It is another object of this invention to minimize uncertainty and wait times associated with shared-ride, mass transit, and car rental (including taxi) by providing timely information of the location and current schedule of vehicles such that the user need not wait during a trip making process.

It is another object of this invention to provide mobility to persons who make a sequence of trips more attractive by providing a system of shared cars or car rental that handle those trips in the sequence not conveniently handled by shared-ride or mass transit mode.

It is another objective of this invention to provide a convenient access and billing system for all modes of travel, shared-ride, mass transit, or car rental (including taxi) such that the user need not be bothered with cash or tokens but rather receives a monthly billing perhaps as part of the cellular communications bill.

These and other objects, features and advantages of the present invention will become more apparent upon reading the following specification in conjunction with the accompanying drawing figures.

DETAILED DESCRIPTION OF PREFERRED EMBODIMENTS

Figure 1:
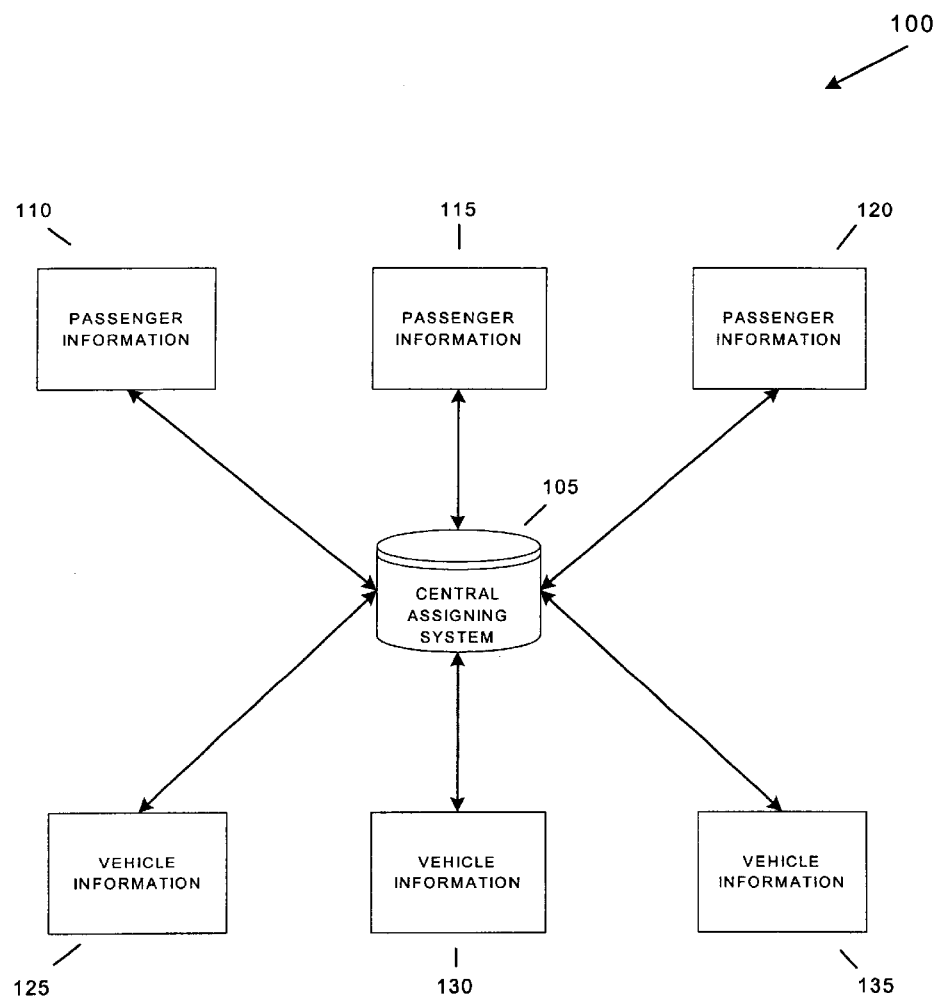
FIG. 1 is a block diagram illustrating an exemplary embodiment of the present invention.

Referring to the diagram of FIG. 1, the preferred transit system of the present invention integrates passenger information 110–120 and vehicle information 125–135 through a central assigning system 105 preferably via wireless communication devices. The central assigning system 105 monitors and evaluates numerous data of the passengers and vehicles. The evaluation of the data can be periodic or continuous. Exemplary data items monitored and evaluated by the central assigning system 105 include: the identification of all vehicles in the system, whether active or inactive, transit or rental, in terms of location and assigned tasks; the identification of all passengers in the system, whether active or inactive, in terms of trips and assigned vehicles; and the identification of all drivers in the system, whether active or inactive, in terms of assigned trips and vehicles. Data about shared ride vehicles including rail, bus, van and car pools. The data includes current location, status (on or off line), current passenger assignments, passengers on board and locations to pick up. Data about individuals who have subscribed to the system can also be stored. These include standard trip configurations, contact data (cell phone no.), current status (on a vehicle and destination), and data needed for billing. Addition exemplary forms of data include data about vehicles used for short term rental that may include vans and cars used for ride-sharing. Location, reservations for use, and degree of damage are other data items. These data items can be stored in the central assigning system 105 or in remote databases.

Figure 2:
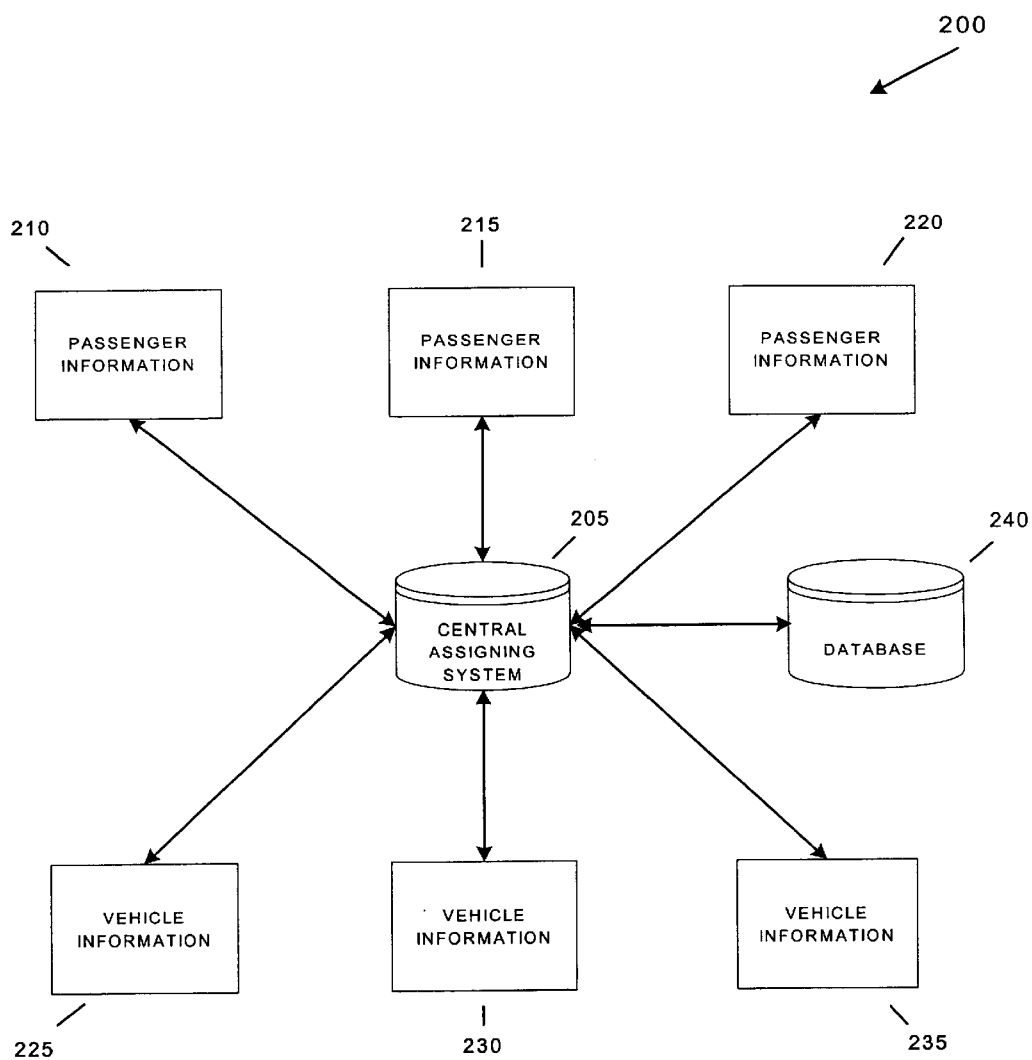
FIG. 2 is a block diagram illustrating a second exemplary embodiment of the present invention.

FIG. 2 is a diagram illustrating an exemplary embodiment of the present invention in which the central assigning system 205 is in remote communication with a database 240. Database 240 can comprise multiple databases each storing passenger data 210–220 and vehicle data 225–235. In one aspect of the invention, passenger data 210–220 and vehicle data 225–235 can be communicated directly to the remote database 210 and the central assigning system can access the data from the database 240.

It will be appreciated that the system can comprise multiple databases. In one embodiment, the invention contains at least three databases: transit vehicle data; user data; and rental vehicle data. The transit vehicle database can contain data about the vehicles in the system and about data concerning the trips made by the vehicles. The data can include any item of information that will assist in the assignment of users to vehicles or vehicles to users. Exemplary data items in the vehicle database include: vehicle ID and name; list of drivers or link to list with priorities; vehicle type; vehicle description; passenger capacity; schedule type; route type; schedule data; route data; and trip lists. Each vehicle can be identified with a unique alpha numeric identifier and optionally a name. The name could well be a manufacturer's vehicle number and an ID can be used internally to identify the vehicle. Each vehicle can have a list of prospective drivers. The type of vehicle and the vehicle description can be used to communicate with users for their assignment of trips and for the passengers to identify the vehicle. Vehicle identification by passengers is particularly important in car and van pooling.

Vehicle trip identity is a database that contains sufficient information to maintain a record of the trip for the purposes of scheduling the passengers and the trip, prior to the trip, or billing or driver payment, after the trip is completed. Exemplary data items include: vehicle ID, trip start time, trip location itinerary, trip schedule time, and trip schedule. Central to this data is the trip schedule, passenger loadings and IDs which can be updated as passengers are added to the vehicle schedule. The trip itinerary refers to the stops planned. The trip schedule refers to the times at those stops. These times are not static, but rather are updated as information becomes available. When this information becomes more certain, the passengers on the passenger list are notified using the contact information obtained via wireless communication.

The user data can contain the following exemplary data items: user ID; user name; user description; register trips; activity lists; billing information. This data should be sufficient to describe the user's actual use of the system. Information on trips can include: trip ID number; trip name; list of potential boarding and debarking points; linked list of walking times to and from specific points; and list of potential car rental points at destination. The activity list data can include: data of reservation; trip ID; details of trip; billing date; and payment status.

The rental vehicle database can contain data items including: vehicle ID; vehicle type; vehicle description; passenger capacity; location descriptions and trip lists. Additional data items can include: rental start time, reservation; rental start location; rental end time, reservation; rental and location; renter ID; rental start time, actual; rental end time, actual; and rental end location, actual.

Figure 3:
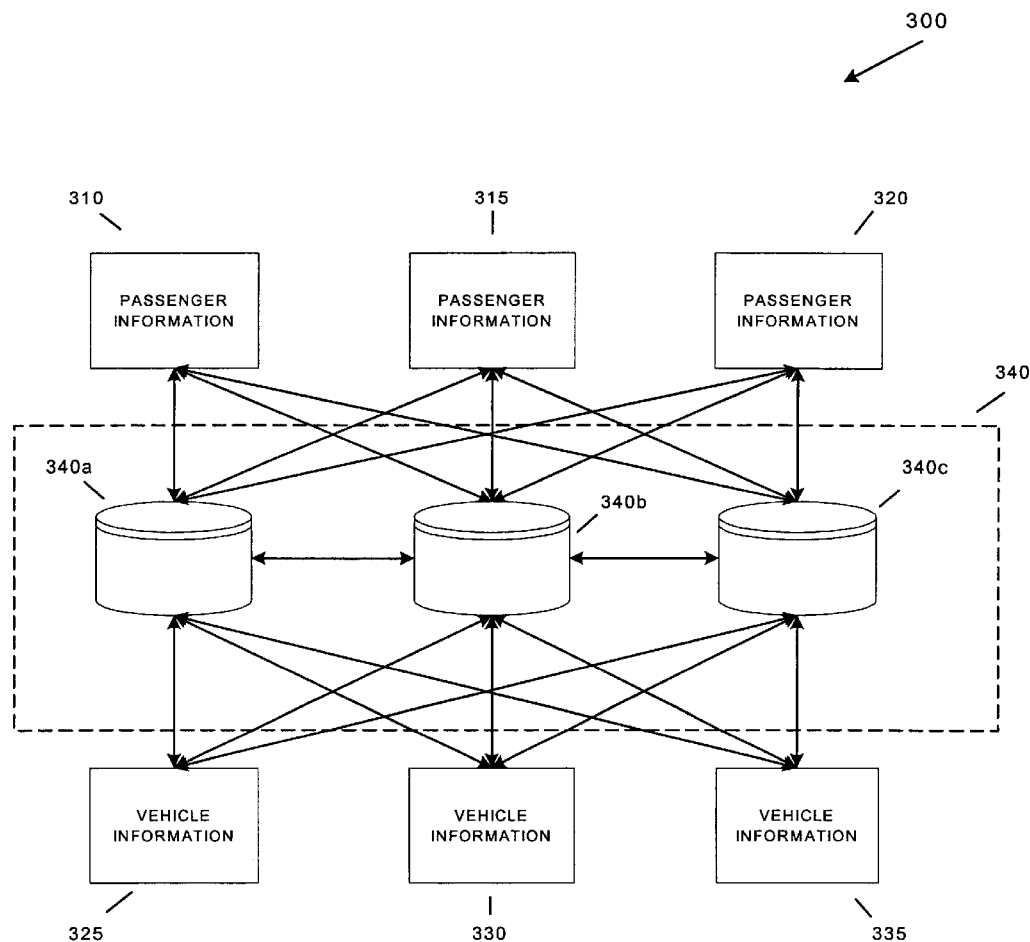
FIG. 3 is a block diagram illustrating a third exemplary embodiment of the present invention.

FIG. 3 is a diagram illustrating an exemplary embodiment of the present invention in which the central assigning system 340 consists of a series of networked computers or workstations 340a, 340b, and 340c with specific software to support the entire transit system. Vehicle data 325–335 and passenger data 310–320 can be communicated to any component of the distributed computing assigning system 340.

The central assigning system 105, 205, or 340 of the present invention generally consists of a computer consisting of a processing unit which interfaces with a memory storage device, a display device and a user input device although unattended operations is anticipated. When the central assigning system consists of multiple people and vehicle assigning computers, the computers can be networked. The network can be established using standard telephone lines, cable lines, fiber optic cables, wireless communication devices, and the like. The information processing devices can be personal computers which provide additional processing ability when combined with communication devices of passengers and drivers. Information processing devices can be integrated with communication devices including hand-held digital phones and pagers for all passengers and drivers. Additionally, information processing devices can be vehicle-based computers that incorporate Global Positioning System (GPS) and other wireless technologies, providing additional processing to the communication devices of the vehicles.

Figure 4:
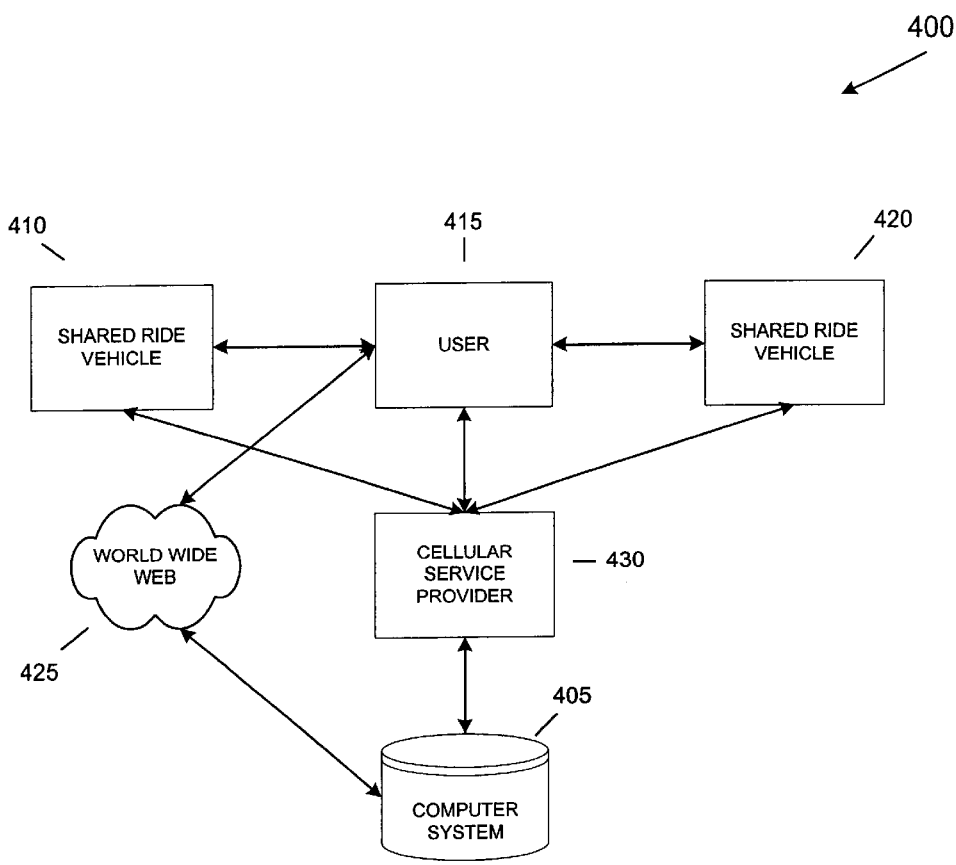
FIG. 4 is a block diagram showing another embodiment of the present invention.

FIG. 4 is a diagram of another preferred embodiment of the urban transit system. In this embodiment, the transit system comprises a user 415, a shared ride vehicle 410 such as a car equipped with a communication device, preferably a cellular communication device, and a shared ride vehicle 420 such as a train, bus, vanpool, or carpool, equipped with a communication device, preferably a cellular communication device and optionally equipped with a Global Position System device. The cellular communication devices can be supported by a cellular service provider 430. A computer 405, preferably a networked computer system can be in contact with the cellular service provider 430 to maintain communication with the user 415 and shared ride vehicles 410 and 420. Additionally, a user 415 can be in communication with the computer system 405 using the World Wide Web 425. Communication between the user 415, the shared ride vehicles 410 and 420 can be accomplished using short range radio frequency, infrared, or moderate range radio frequency devices. Communication using the World Wide Web can be accomplished with high speed land lines, cable lines, optical fibers, and wireless communication devices. It will be appreciated that multiple users and multiple shared ride vehicles are encompassed in the present invention.

Figure 9:
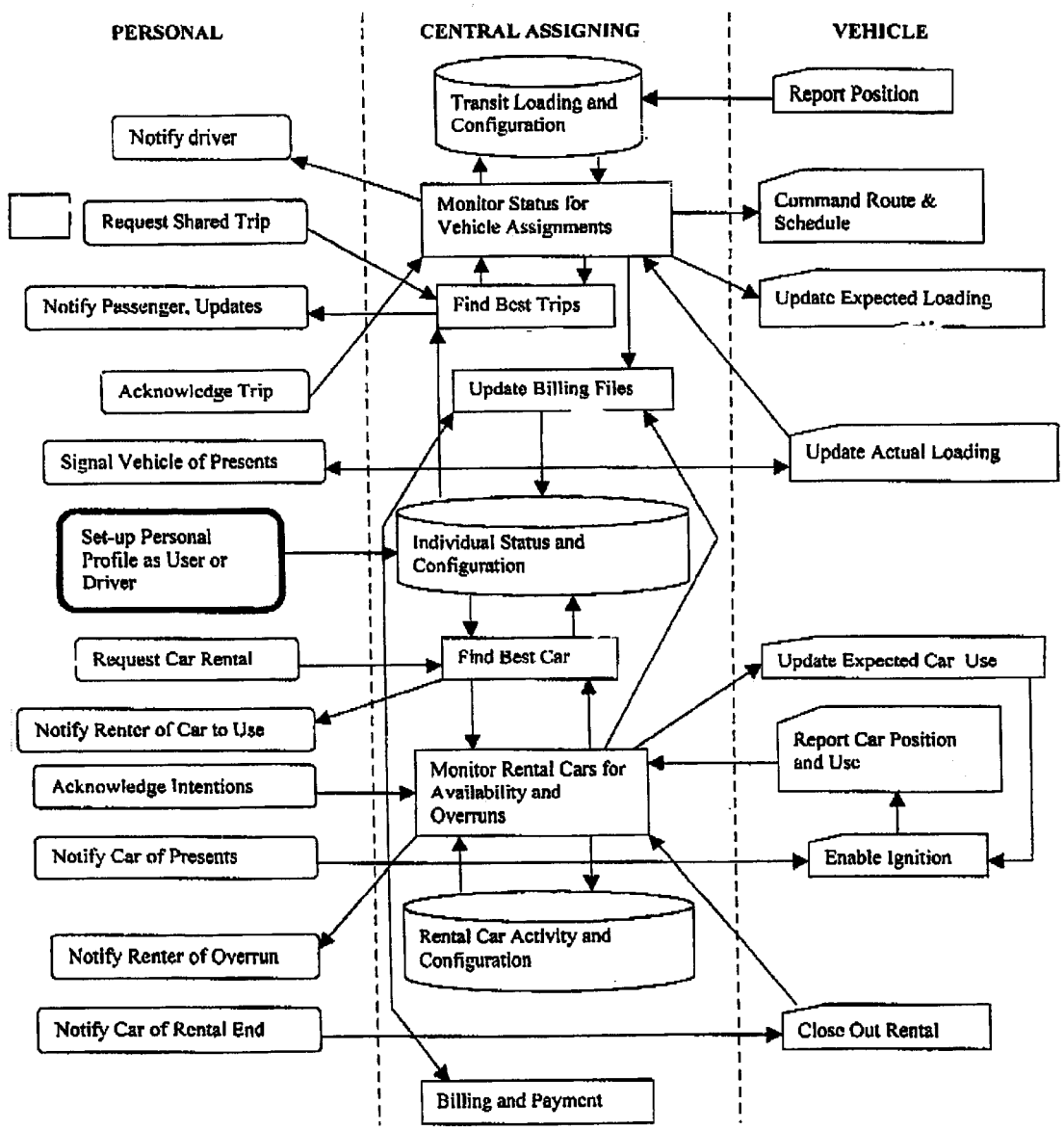
FIG. 9 is a composite flow diagram illustrating the functional interaction between passengers, vehicles, and the central assigning system.

The software of the assigning system can include numerous combinations of the elements of Table 1, which provides details for each element of the flow chart of FIG. 9.

The present transit system makes use of all urban passenger vehicles, including standard cars, Sport Utility Vehicles (SUVs), minivans, vans, minibuses, buses, trains, rail, and light rail used for multiple passenger transit. Most vehicles smaller than buses are driven by passengers, deemed ride-sharing drivers herein. That is, the vehicles are used for shared rides for only one round trip per day and are parked at the home of the passenger/driver in the evenings. This is known to minimize the total cost of the present transit system because professional drivers make use of such vehicles for employment trips too expensive. Rental cars are generally midsize or smaller for purposes of reducing fuel consumption and economic cost.

Communication devices between the vehicles, passengers, drivers and the central assigning system are preferred to be wireless devices such as cell phones, digital pagers and personal digital assistants with wireless capability. Communications between different elements of the central assigning system are generally by Intranet for co-located computers, or by land lines, e.g., DSL and T1, and dedicated high speed lines, e.g., fiber optics, for distributed computing. All vehicles and passengers in the transit system are equipped with communication devices. Passenger communication devices/cell phones can incorporate different features than the communication devices of vehicles.

The software of the cell phones of passenger communication devices is such as to limit human interaction. For example, the use of a rental car may not require human interaction in order to make the ignition work. Similarly, logging of passengers on vehicles and the subsequent billing for services can be entirely transparent to, and effortless by, the passengers and drivers. Limiting passenger involvement is described in further detail below.

Locating functions for all vehicles used in the present transit system are by wireless equipment, e.g., GPS and/or cellular locating electronics. Current developments in cellular locating systems are less known than GPS, but are reaching the market. References to GPS in the present disclosure refer to the locating function for all vehicles in the transit system, and may be used for all passengers.

Conventional cellular systems allow only a crude locating function to be implemented by observation of the cell tower location used to transmit the messages to and from the cell phone user. This capability is used by the present system so as to help automatically verify that a request for service is "reasonable." For example, a passenger requesting a standard employment trip ASAP, coded as a single key, must be located near the standard residence or employment location. (The assigning system would note the ASAP request and the distance/time from the passenger to the origination site) If such distance/time was incompatible with an ASAP request, the assigning system would further interrogate the user to resolve the conflict.

The system monitors the locations of all vehicles in order to provide accurate, real-time information on when a passenger will be picked up. In one embodiment of the present transit system, passengers would expect to experience less than fifteen minutes, preferably less than ten minutes, more preferably less than five minutes, and most preferably less than one minute deviation in pick up times relative to the last provided advisement from the assigning system.

The communication devices of the vehicles can work in tandem with information processing devices. Information processing devices are later described as elements of the central assigning system, and preferably are computers enabling processing power perhaps not a part of, or in addition to, the communication devices. Such information processing devices can be remote from the vehicle's communication device(s). All devices of the present system preferably have computing capability. In a preferred embodiment of the present transit system, the features of the communication and information processing devices of shared-ride vehicles include:

1. knowledge of, and if appropriate display to drivers of, the names and identifying characteristics, e.g., 25 year old male, of the passengers who are expected at each pick up point/origination and drop off point/destination for the particular shared-ride vehicle;
2. knowledge of, and if appropriate display to drivers of, the times the particular shared-ride vehicle is expected at each pick up point and drop off point;
3. knowledge of, and if appropriate display to drivers of, the preferred route between pick up points and drop off points;
4. knowledge of, and if appropriate display to drivers of, the names of the passengers who are actually at each pick up point, the names of the passengers missing at each pick-up point, and the names of the passengers to be dropped off at the next destination point; (Most of this information comes from low range interrogation of the low power ID function of the cell phones)
5. display options of such information (items 1–4) being audio and/or visual in order to minimize driver distraction;
6. communication abilities between the vehicle, passengers and central assigning system related to such information (items 1–4); and
7. retention ability such that short term audio, visual and/or digital information can support a "black-box" that enhances security and system statistically based improvements.

Several items regarding the preferred features of the communication and information processing devices of shared-ride vehicles should be noted. For example, one passenger's destination site can be another passenger's origination site. The visual display of information to the driver can incorporate "heads-up" display technology to minimize the distraction to the driver, and further may be voice actuated.

Security subsystems of the present transit system can identify non-users and criminal activity of passengers thus reducing such irregular activity. System improvement subsystems can include the gathering of engine and vehicle performance and maintenance requirement. The information transmitted and received between the vehicles and assigning system are also used to support locating and billing functions of the transit system.

The passenger communication devices can also include information processing devices, or such information processing devices can be remote from the passenger's communication device(s). In a preferred embodiment of the present transit system, the features of the communication and information processing devices of cell phones of passengers include:

1. One button request for service. On a system phone, this would give at least ten such request possibilities. Examples of "standard" request possibilities/trips are: (i) employment trip(s), (ii) school trip(s), (iii) shopping center trip(s), (iv) medical service trip(s), and even (v) standard restaurant and (vi) entertainment trips. Thus, car rental would often be an available service at work location(s), near residential location(s), and at commercial center(s).
2. Display to the passenger of expected times of pick-up and drop-off, and locations of such.
3. Alternative routes/choices (over that of item 2) for expected times of pick-up and drop-off, and locations of such.
4. Display of fare and/or rental fee if the trip profile of the passenger requested such fee information.
5. One-button selection of service to be reserved, and those to be declined.
6. One-button request for additional information, e.g., costs, more alternatives, and the day's expected weather, to name a few.
7. display options of such information being audio and/or visual.

The driver communication devices can also include information processing devices, or such information processing devices can be remote from the driver's communication device(s). In a preferred embodiment of the present transit system, the features of the communication and information processing devices of cell phones of drivers include:

1. Display of expected times of pick-up and drop-off, and locations of such if required for trips to be made by the driver.
2. One-button request to change normal driving route and/or to volunteer to drive in the immediate future. This volunteering to drive allows dynamic "car-pool" assignment. Examples of these prearranged one-button interpretations include (i) I will be ready to go 10 minutes earlier than normal (twice means 20 minutes), (ii) I will be ready to go 10 minutes later than normal (twice means 20 minutes), (iii) I will be available for a pool assignment for the next 15 minutes (twice means 30 minutes).

It will be understood that these features are in addition to those of passenger cell phone features, as drivers may be passengers as well. Further, this itemization of driver cell phone features does not replace the features of the communication and information processing devices of shared-ride vehicles that included driver information as well. These additional features supplement the vehicle system and allow the driver to be remote from the vehicle.

Preferred Methodology

Figure 5:
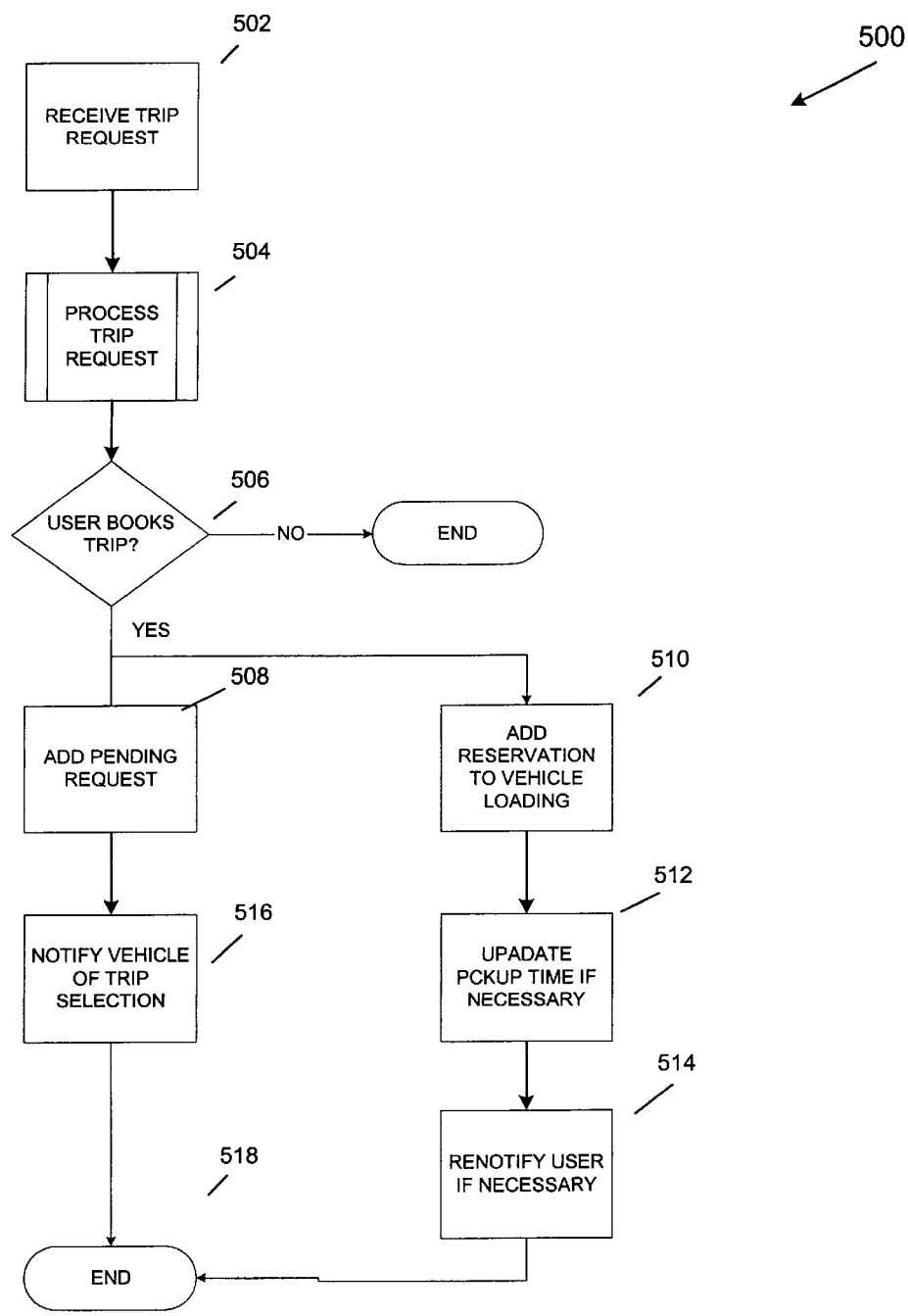
FIG. 5 is a logic flow diagram illustrating exemplary steps of one aspect of the present invention.

FIG. 5 is a logic flow diagram of a preferred embodiment of the present transit system. In step 502 the system receives a request from a user for a standard trip from an origination site to a destination site. A standard trip, for example, is requested by pressing a single digit on a cellular phone (or two-way pager) and pressing 'send' or by using a short range radio frequency transmission devices. "Send" may be a different button for transit functions than for standard phone or pager functions. Alternatively, the passenger may select a transit menu on the phone before making the single digit selection. A passenger can also use the World Wide Web or standard land line to communicate with the central assigning system. Different standard trips have different digits. A scheduling computer of the central assigning system is set up to recognize from the sending unit (caller ID, cell, and time) what trip is being requested. This ability does not preclude verification and solicitation of additional information, e.g., is the need as soon as possible, or delayed.

In process 504, the central assigning system processes the trip request received from a passenger. The central assigning system integrates information automatically transmitted from the passengers communication device or information. The automatically transmitted information is information that need not be specifically entered and transmitted by the passenger. Exemplary automatically transmitted data includes but is not limited to location data, passenger specific data such as travel preferences and billing preferences.

Figure 6:
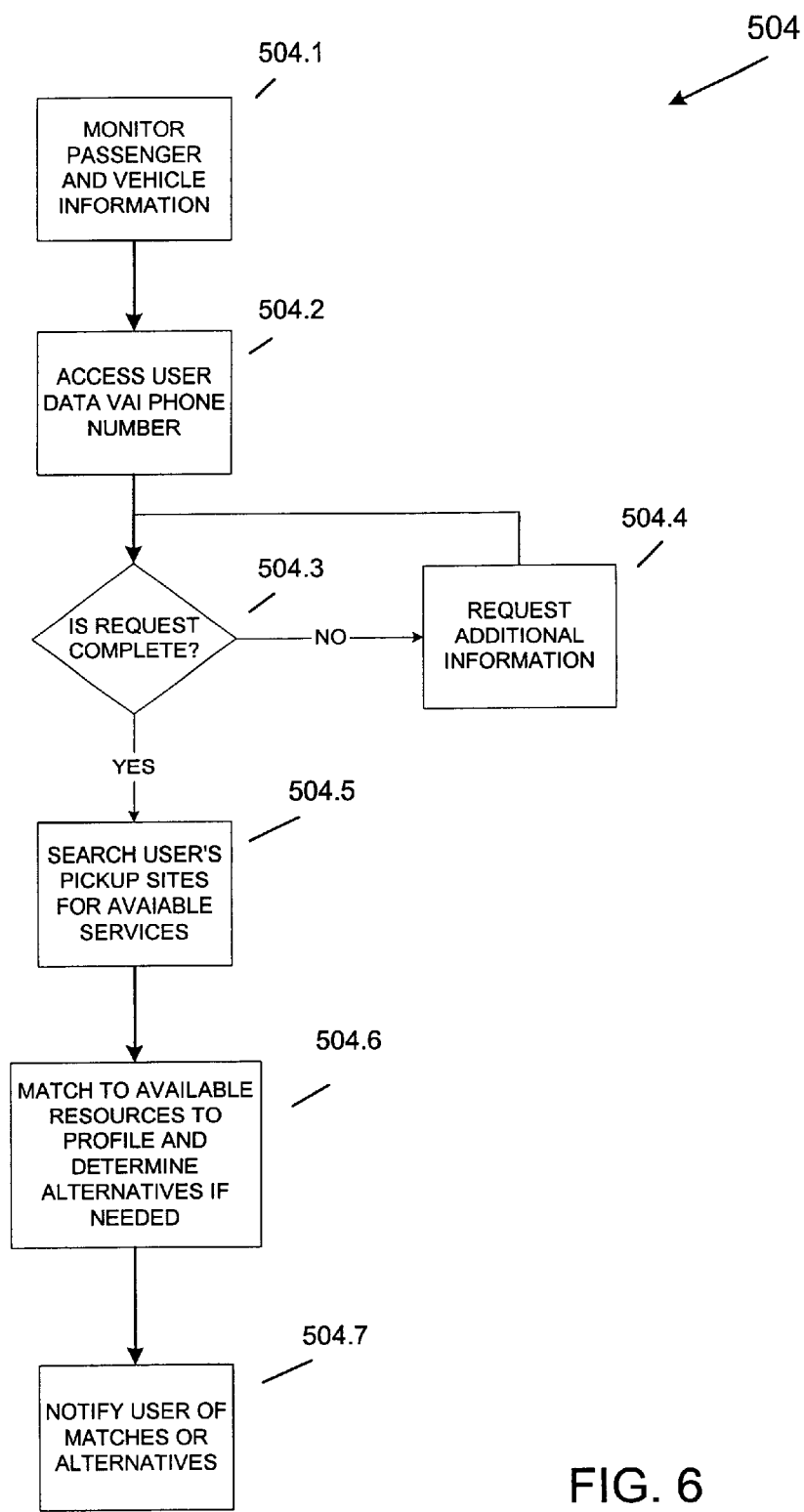
FIG. 6 is a logic flow diagram illustrating exemplary steps involved in processing trip requests.

In FIG. 6 process 504 is explained in detail. In step 504.1 the central processing system is continuously monitoring passenger, vehicle, and travel condition information. The date includes current location, status, current passenger assignments, passengers in vehicles, and locations for passenger drop-off or pick-up. Exemplary data for rental vehicles include location of vehicle, reservations for use, and vehicle damage. In one embodiment, vehicles are equipped with locating means, e.g., GPS and periodically report position. During passenger pick-up periods this reporting is frequent so that passengers can be notified of pick-up times. The central processing system can also provide information to a driver while the driver is in a vehicle. The information can be audio, visual, or text data on routes, travel conditions, route conditions, and passengers.

In step 504.2 the central assigning system access the user's data by accessing the cellular phone number associated with the user. This data can include location, status, new passengers, new destinations, and passengers delivered to destinations. The central assigning system can communicate updated passenger and vehicle information directly to vehicles and drivers. A driver uses the information to know how many people and optionally exactly who is to be picked up at each stop. As people approach the vehicle, the central assigning system can verify that expected persons are present based on received location data of passengers and vehicles.

In step 504.3 the central assigning system determines whether the trip request is complete. If the trip request contains enough information for the system to associate the user with a profile and match the request with available services the system with move to step 504.5. If the system determines more information is required, the system will request additional information in step 504.4. In step 504.5 the system searches the users pickup sites identified using the user's cellular phone number. The system will match a user's request with existing services located at or near the user's pickup sites in step 504.6. The system will also determine alternatives to the user's request if precise matches cannot be made. In step 504.7 the system notifies the user of matches and or alternatives. In one preferred embodiment, the central assigning system determines the trips based on predicted travel time including wait time, and cost and ranks the trips according to trip time, cost, or both. If a passenger prefers a method and route of transportation without regard to cost, the central assigning system will determine and display the methods and routes of transportation having the smallest total travel time from receipt of request to delivery to destination. Alternatively, the central processing system can determine and display the method of transportation and route that minimizes passenger costs. In yet another embodiment, the central processing system can use cost and time parameters received from the passenger to determine methods of transportation and routes that match or closely approximate the passenger's request with regard to the passenger's parameters. It will be appreciated that the central processing system can determine methods of transportation and routes based on multiple parameters received from a passenger alone or in combination with transit parameters. Transit parameters can include vehicle availability, traffic conditions, travel conditions such as weather conditions, vehicle location, driver availability, vehicle status, driver status, and the like. Additional exemplary passenger parameters include preferred routes, preferred means of transportation, preferred number of additional passengers in shared-ride vehicles, preferred type of vehicle, time of day of travel, duration of travel, preferred method of payment, and the like. The central assigning system can process a passenger's parameters with the transit parameters to provide the passenger with transit alternatives that closely match the passenger's parameters. In a preferred embodiment, the central assigning system matches a passenger's parameters with current transit parameters to provide the passenger with transit alternatives. The parameters can be weighted such that a particular parameter can be given more significance in the processing than other parameters. The weighting of parameters can be accomplished based on passenger parameters or profiles. Once the routes and methods are determined, the central processing system allocates them based on a passenger's parameters. In another preferred embodiment, a passenger can create a travel profile that stores the passenger's preferred parameters such that the parameters need not be entered each time the transit system is used. If a passenger requests a rental vehicle, the central assigning system can determine the passenger's assignment based on the location of the passenger and vehicle, the availability of a rental vehicle, the type of vehicle requested, cost, and any other parameter the passenger has indicated.

Returning to FIG. 5, decision step 506 the central assigning determines whether the user has accepted one of the matched services or alternatives. If the user does not confirm the acceptance of one of the matches or alternatives, the process ends. If the user does confirm the trip, the system adds a reservation under for that user in step 510 to the vehicle. The system in step 512 then updates the pickup times for that reservations as it dynamically updates with new vehicle and passenger information. In step 514 the system will update the passenger with revised pickup times if the previous pickup times have been modified based on new data. If only an estimated time (for example, standard deviation greater than 60 seconds) is provided, it is updated by the scheduling computer as soon as practicable. That is, the vehicle may not be verified as "on schedule" and a later digital message to the cell phone provides the updated time and causes the phone to "ring."

If the passenger selects the suggested trip or alternative in step 506, the central assigning system also adds the pending request to the vehicle data in step 508. The passenger can select the trip of an alternative by using a single key on a cellular phone, which may be one of several alternatives presented and may include a request for additional alternatives or data, wherein at this point, the central assigning system is monitoring all key presses and information transmitted from the passenger's communication device. Confirmation can include requesting the passenger to verify selection of the trip by selecting the trip again or by pressing a selected key on the communication device. The passenger can confirm the selection by pressing a key "end" or choose a menu item that cancels the reservation or requests a return to previous steps. If the communication between the passenger and the central assigning system ended with a trip time being only approximately defined, the system will notify the passenger with updates and the times displayed. In one embodiment, the passenger can be notified of updates after a distinctive phone ring. The distinctive phone ring can be programmed to identify the type of update or information being received from the central assigning system. In step 516 the central assigning system then notifies vehicles and/or drivers of passenger assignments.

For experienced users, process 500 can take about 5 seconds for standard, often used trips. In preferred embodiments, common or repeated trips, e.g., the employment trip, can have a standard reservation that is assumed to be in force unless canceled or deferred. A passenger can create a travel profile that includes the trips needed, the days and times the trips are needed, preferred modes of transportation, and preferred billing methods.

In other embodiments which include drivers of shared ride vehicles, the driver of the vehicle can verify the pick up of the passenger or the drop off of a passenger via wireless communication. In other embodiments, the passenger can communicate with the central assigning system to indicate pick up. The central assigning system updates the vehicle with real-time traffic situations and updated passenger pick up needs. The central assigning system verifies the routing information to reduce time delays based on fluctuations in traffic and travel conditions. After delivering a passenger to a destination, the vehicle is notified of its next destination and updated with traffic and routing information. In the case of passenger driven vehicles, there would usually be an overnight or long daytime delay before the next trip. Once the passenger is delivered to the passenger's destination, the central assigning system bills the passenger for the trip. The bill being presented at a designated date.

It will be appreciated by those of ordinary skill in the art that the central assigning system is periodically notified of status information, including the vehicle's position and passengers who have boarded or left the vehicle. The latter information can be used for billing and security.

In other embodiments, the driver of a shared ride vehicle is able to notify the central assigning system of abnormal delays encountered. Such notification can be accomplished by communicating directly with the central assigning system using a cellular phone, short range radio frequency communication device, or information device.

Concurrent to the passenger and vehicle assignments by the assigning system, the assigning system is continually receiving data regarding various other information pertinent to the transit system, including traffic flow times and delays, and abnormal weather in order to notify the passenger and vehicle of important route information. The central assigning system receives the most important and timely information from vehicles already in the system. Because a multitude of vehicles are traversing a multitude of routes, the central assigning system can build tables of both normal times, variances in such normal times, and observe unusual delays. Thus, on average, the assigning system has the ability to make accurate estimates of times that passengers will be picked up and delivered, as well as to provide routing suggestions to drivers. The accuracy of the information gets better as an event, e.g., pickup, becomes closer.

For vehicles that make regular trips for long periods of time, normally mass transit buses and trains, the future schedule can be updated. For other vehicles that have long parked layovers, the future schedule can be determined by communications with the driver(s).

It is not necessary that all passengers be assigned prior to a vehicle beginning a trip, as this can be done dynamically.

Such service is sometimes called "dial-a-ride" or "jitneys" in other circumstances. The described methods enhance such services.

After the passenger accepts the service proposed by the central assigning system, the passenger makes his/her way to the origination site. In preferred embodiments, the passenger is alerted when the vehicle is at a range of about 1 mile to about 30 feet. Alternatively, the passenger can be alerted when the vehicle is about fifteen to about two minutes away based on the central assigning systems calculations and the passenger's profile.

Figure 7:
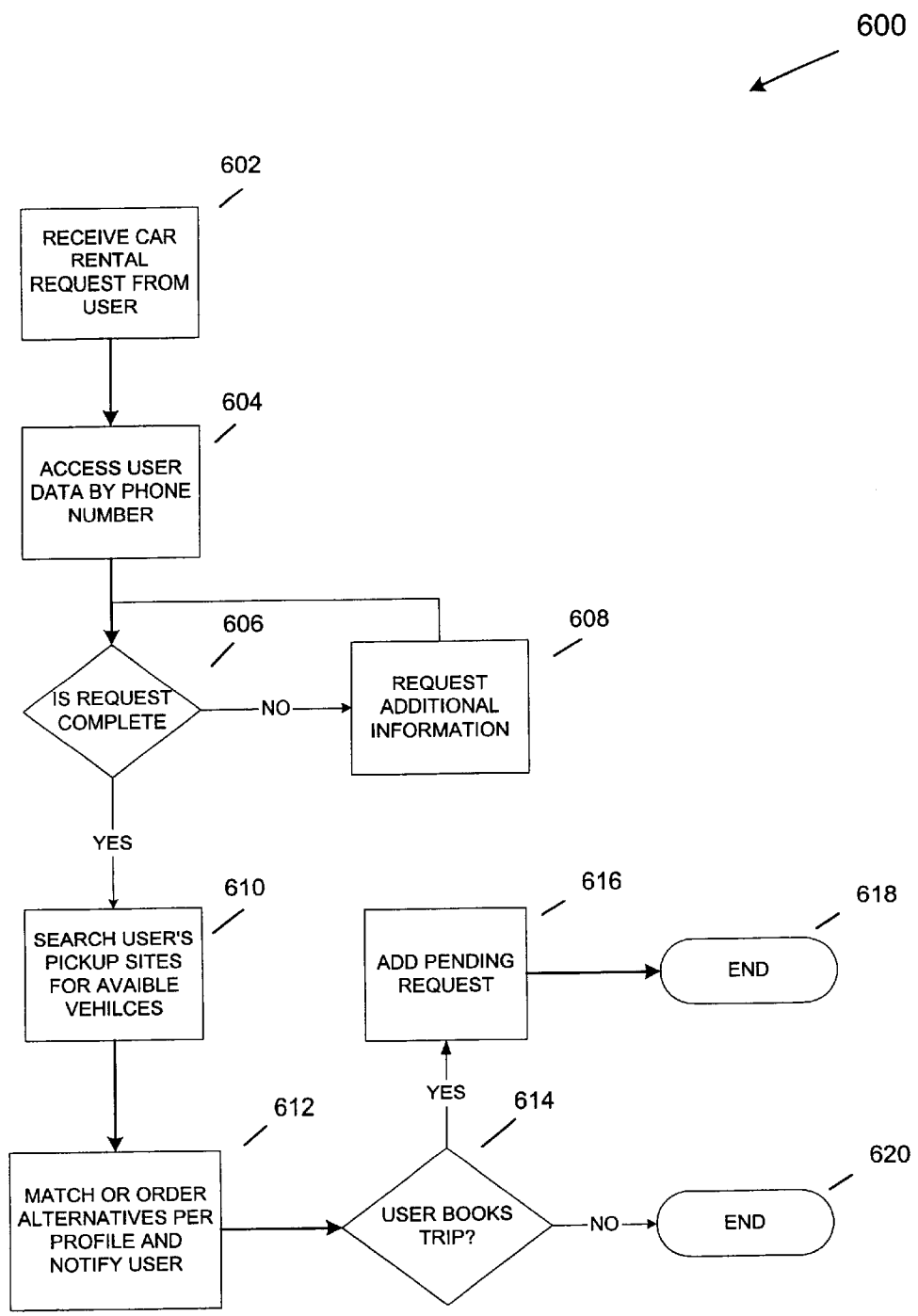
FIG. 7 is a logic flow diagram illustrating exemplary steps of the invention as it relates to rental car usage.

FIG. 7 is a logic flow diagram of an exemplary embodiment of the present transit system for rental vehicles. In step 602, the system receives a car rental request from a user. The system accesses the user's data by correlating the user's cellular phone number and cellular based location information and immediately preceding trips by the passenger to the user profile in step 604. In decision step 606, the system determines whether the request is complete. If the request is not complete, the system requests additional information in step 608. If the request is complete, the system searches the user's pickup sites for available vehicles in step 610. In step 612 the system matches the user's request against available services and notifies the user of the matches or alternatives to the user's request.

In decision step 614, the system determines whether the user confirms a match or alternative supplied to him. If the user does not confirm a selection, the process ends in step 620. If the user selects the trip, the system adds the request to the vehicle data at both the car and central assigning system and the process ends in step 618.

Car rentals can be "standard," meaning a single key press can reserve a particular vehicle based at a particular location, such as a workplace location. Communications define which car from the pool to take and a request an estimate of the time of the rental. The default car return is to the rental location. Further, rental cars do not require a key, but rather are authorized for a particular user through the communication devices. A preferred method of steps of the present system for car rental is as follows (assuming the cell phone is on or a device using short range radio frequency (RF) transmissions):

After the passenger has complete process for a car rental and confirms selection of a provided trip or alternative, the central assigning system confirms the rental to the cell phone or other communication device. The central assigning system notifies the rental car of the expected rental, and provides the verification code of the passenger/renter so that when the passenger/renter is in proximity to the vehicle, the doors can be unlocked by pressing a key on the passenger's cell phone. The passenger then picks up the rental car. The passenger can be notified of the location of the rental car directly from the central assigning system. If a passenger fails to pick up a rental vehicle at a specified time or return vehicles late, the scheduling and assignments are updated by the central assigning system. In preferred embodiments, the passenger presses selected keys or combinations of keys on a communication device to unlock, enable the ignition of the vehicle, and operate the car. The passenger operates the vehicle, and returns the vehicle to a designated location. The passenger/driver manually disables the ignition and locks door when leaving the vehicle. When the car is returned to the designated location, the passenger presses a key on the cell phone to terminate the rental. The assigning system acknowledges the termination of the rental with an appropriate message, and provides certain data such as time of use and cost and bills the passenger/renter. In the preferred embodiment short range radio frequency (RF) transmissions are used. A currently popular short range RF standard for a host of uses is Bluetooth®.

The present transit system can further comprise an automated billing subsystem, wherein payments are made through monthly billing, as in most public utilities. A preferred method of billing is a utility style billing, with inclusion of transit activities incorporated into a cellular telephone communications billing that is sent to the user as part of their regular cell phone or pager billing. As with other utility billings, it might be paid automatically by credit card or bank debit, payment handled through the World Wide Web, or paid by check in the mail. Payment method would be part of the passenger's profile as discussed earlier. As with other utilities, the fees could contain monthly fixed charges for having the service available, differential charges by time of day, mode of transit, and even based on performance. For example, if a trip took longer than it should, the fee might be reduced or waived. Similarly, failure to return a rental car on schedule could cause a premium charge. Some of the charges may be lower than commercial rates because of the public subsidy often associated with urban mass transit.

Figure 8:
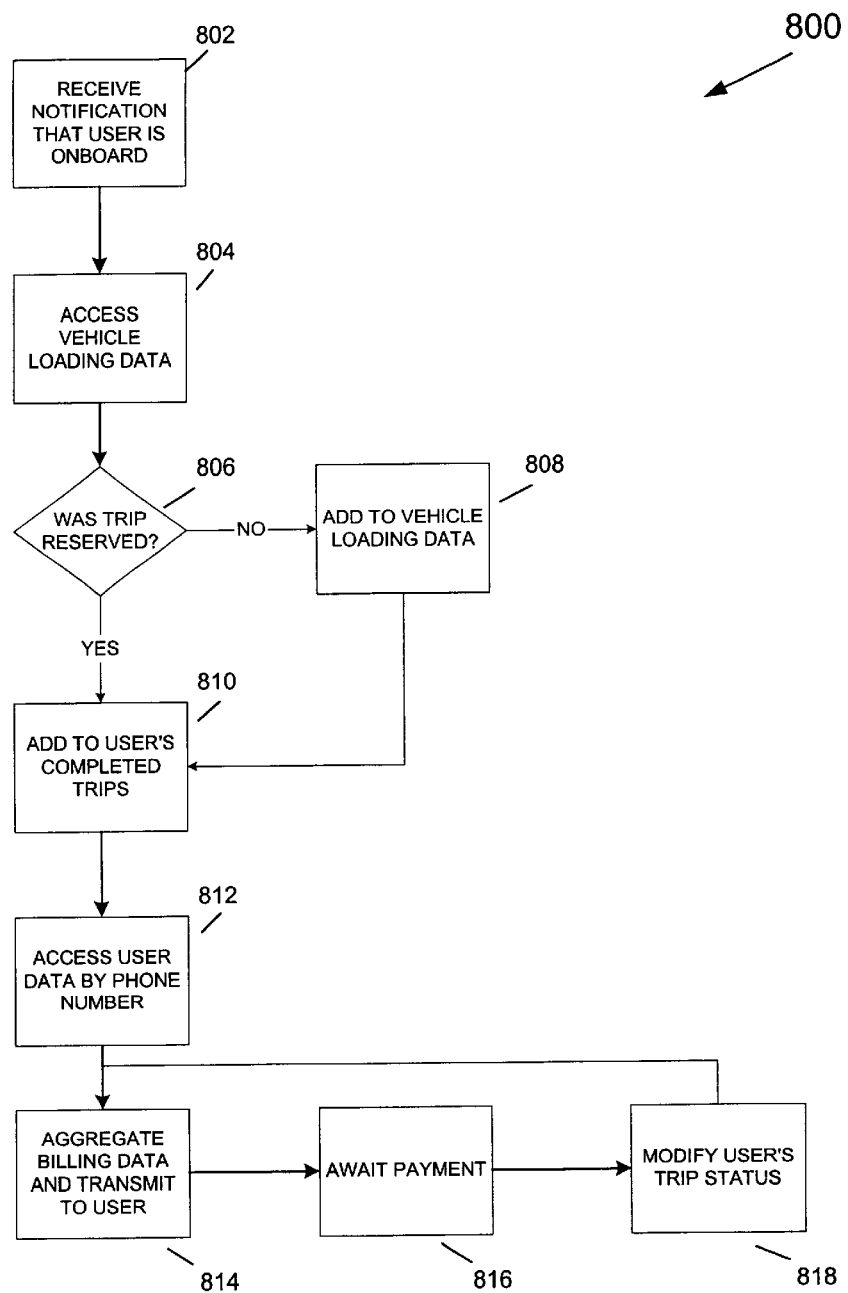
FIG. 8 is a logic flow diagram illustrating exemplary steps of automated billing component of the present invention.

FIG. 8 is a block diagram illustrating the automatic billing aspect of the present invention. In step 802 the system receives notification that a user is onboard a vehicle of the system. The system is notified preferably using wireless communication devices. In step 804 the system accesses the vehicle loading data, and determines whether the trip was reserved in decision step 806. If the trip was not reserved, the system adds the trip to the vehicle loading data in step 808. If the trip was reserved, the system adds the trip to the user's completed trips record. The system accesses a user's data in step 812 by accessing the cellular phone number associated with the specific user. In step 814 the system aggregates all the trips of a user in one bill statement and transmits the billing statement to the user's cellular phone. It will be appreciated that written bills can be generated and mailed or sent electronically to users if requested or preferred by a user. In step 816 the system awaits payment form the user. In step 818, the system updates the users aggregate billing. Billing statements can be transmitted to users on a user's preferred billing date. It will be appreciated that the system can credit payments received and charge trips taken as the event occurs.

All ride-sharing vehicles larger than a van or for short term rental are owned by the present transit system. Privately owned cars, minivans, and vans are used on a rent-from-owner basis, including his services, in order to relieve the owner of risks and minimize incentives to "skim" passengers. That is the financial risk associated with privately owned vehicles is assumed by the system in order to provide an incentive for the privately owned vehicle/driver to operate in the interests of the system as a whole rather than on a short term personal basis. The word "own" is used to include conventional vehicle leases. Clearly private owners of ride-sharing vehicles and rental cars would receive monthly (or periodic) compensation for their vehicle costs and personal services. However, the pay for driving itself might be zero. For example, a person owns a minivan on which up to five additional passengers can be assigned. The system provides the communication system for the vehicle and pays the direct costs of owning and operating the vehicle. The owner/driver is not paid for his services for those trips he would have made anyway. His compensation is a "free" or reduced cost personal vehicle and a "free" trip.

Rental cars are likely to be owned by the system, however, they could be owned by private owners particularly in the likely circumstance that the private car would otherwise spend a large part of the day parked (the usual situation). An owner would register his car for rental for example while at work or at home. Clearly this is practical for many people while at work. They have driven to a job where almost always the car is parked during the work period. Cars regularly used for rental would likely have preferred parking. In residential areas this perhaps seems less practical; however, many homes have excess cars during the evenings and nights because only one car is likely to be needed. The system could allow these owners to rent, perhaps to a very well defined set of neighbors. These neighbors would access the car through the usual automatic identifications system, including the possibility of automatically opening garage doors and automatic notification of owners of the impending and actual rental. Again the owners need be compensated.

Revenue for the system can come from three sources, fares for shared rides (the usual transit charges), car rental charges, and public subsidies. Most current transit systems pay less (often far less) than 50% of the true economic costs through fares. The proposed system is expected to do much better because the actual economic cost of rides has actually decreased relative to the current drive you own car or standard transit system. Surprisingly, many transit rides actually have higher total costs per passenger mile than the private car. This is caused by high labor costs for bus trips and very high capital costs for rail trips.

The central assigning system can further support high-occupancy vehicle preference subsystems, for example, High Occupancy Vehicle (HOV) lanes, vehicle parking preferences, and traffic control priority where beneficial. Regarding the latter, because the system is following the real time progress of high occupancy vehicles, it can be tied into the traffic control lights and adjust the timing of the green and red cycles to improve the passenger throughput at intersections. The passenger throughput, not vehicle throughput, is the true measure of effectiveness. In a modem system this would also use the cellular radio communication system to communicate with the traffic control elements.

The present transit system can apply equally well to non-urban and freight transportation systems, as well as other non-transit related messaging. Other embodiments of the present invention can include systems for the truck and taxi industry, including vehicle scheduling, control and tracking. In early embodiments of this invention, taxi service in congested areas using the described methods for shared-ride trips are an attractive alternative to car rental service for short trips. Other embodiments of the present system include providing communication between the central assigning system and a person that can utilize landlines (phone) and/or PC web pages.

Further, participants in the system may have reciprocal privileges in other cities using "roaming" with their cell phones. This could be for both car rental and ride-sharing.

Further, the transit system can be designed to send people their daily "paper", and other tailored information, that would be stored at the central assigning system and sent to their home computer automatically, for storage on rewritable CDs, or hard disks for example. In this embodiment, the customers would be newspapers, advertisers, or any other body wanting generally to broadcast information to subscribers for subsequent display on a TV or PC or printed. A particular user would be the transit system itself, to provide timely advance information. This could be done off peak, e.g., 1 to 5 AM, when the cellular radio spectrum is more freely available. This proposed use incorporates devices like the USB port (a serial port) for a cellular telephone. It should be noted that USB provides power as well since the cell phone might be active for many hours in the early AM. Thus this function would provide for simultaneous recharge of the cell phone.

All of the communication devices and processors of the present transit system optimally would communicate with each other. In a preferred embodiment, all communications are performed by wireless devices capable of cellular digital communication and of short range, e.g., 20 foot, communication with each other. This preferred configuration eliminates any vehicle-based I/O device, other than wireless hand-held computers, for car rental and for shared ride billing and security. In the case of transit vehicles, trains, buses, and car, bus, and van pools, it is likely that they would be in vehicle I/O devices, but audio and voice driven have advantages in terms of degree of distraction of the driver.

A description of a preferred transit system is shown in the flow chart of FIG. 9 showing the interaction of passenger, central assigning system, and vehicle. Exemplary central processing software subsystems are provided in Table 1.

TABLE 1

| SOFTWARE ELEMENT | FUNCTIONAL DESCRIPTION Note that several functions are performed by the SAME physical device and that computers are distributed. |
|---|---|
| DATA STORAGE | |
| Transit Loading and Configuration | Data about shared ride vehicles including rail, bus, van and car pools. The data includes current location, status (on or off line), current passenger assignments, passengers on board and locations to pick up. |
| Individual Status and Configuration | Data about individuals who have subscribed to the system. These include standard trip configurations, contact data (cell phone no.), current status (on a vehicle and destination), and data needed for billing. |
| Rental Car Activity and Configuration | Data about vehicles used for short term rental that may include vans and cars used for ride-sharing. Location, reservations for use, any damage are data items. |
| HAND-HELD COMPUTERS FOR TRANSIT | |
| Notify driver | Drivers (of van and car pools particularly) need to be notified of the exact time and place of pickups (may be partial list) before actually in vehicle. These people would be notified by hand held device. That is, the central scheduling service, would have some flexibility in requesting service. Similarly back-up drivers would be notified if primary driver was not available, sick or on vacation. |
| Request Shared Trip | A passenger would have the ability with a few key strokes to request a trip, usually of a pre-arranged type, e.g., work trip, specific shopping trip, and indicate whether the need was ASAP, at the regular time, or at a future time entered through the hand-held terminal. A web or standard land line is an alternative. |

TABLE 1-continued

| SOFTWARE ELEMENT | FUNCTIONAL DESCRIPTION Note that several functions are performed by the SAME physical device and that computers are distributed. |
| --- | --- |
| Notify Passenger, Updates | The hand held terminal would display trip options in order of likely preference. This would often be only one as there is an obvious best transit option. It would also display the time of pick-up. If this time of pick-up had an uncertainty of greater than some limit, e.g., 60 seconds, then repeated messages, updates, would be sent concerning the chosen trip so that waiting could be minimized. |
| Acknowledge Trip | The passenger would tell the system which if any alternative trip was to be "booked." |
| Signal Vehicle of Presence | When approaching the transit vehicle (or station in the case of rail) the hand held terminal would notify the vehicle that the particular passenger was present and intended to board. This (1) gives the driver assurance that a particular individual is to be on board, and (2) causes the trip to be logged for billing and vehicle loading purposes in the transit assignment system. Correspondingly the passenger is automatically notified of proximity of vehicle.<br>COMPUTERS FOR TRANSIT ASSIGNMENT |
| Monitor Status for Vehicle Assignments | All vehicles are monitored for location, projected future location, in-service status, assigned passengers, driver information, and actual loading by pick-up location. As trips are assigned this software causes notification of drivers both individually and in-route as to their schedule and passenger loading. If people fail to show up, the loading is changed dynamically. |
| Find Best Trip | Solves the trip assignment task based on available vehicles, their schedules, and their passenger loadings. Also updates passengers as the trip origination time becomes imminent. |
| Update Billing Files | Causes the individual status files to be updated for monthly billing purposes and in the case of dynamically changing drivers, causes any update of compensation due drivers<br>COMPUTERS FOR TRANSIT VEHICLES |
| Report Position | All vehicles are equipped with locating means, e.g., GPS and periodically report position. During passenger pick-up periods this reporting is frequent so that passengers can be notified of pick-up times with precision, e.g., 60 seconds |
| Command Route & Schedule | Causes a driver to get in vehicle audio or visual information on route to follow and stops to make. |
| Update Expected Loading | Causes a driver to know how many people and optionally exactly who is to be picked up at each stop. As people approach the vehicle it verifies that expected persons are present |
| Update Actual Loading | People who board the vehicle are reported to central assignments so that up to date loading and billing information is available<br>HAND-HELD COMPUTERS FOR CAR RENTAL |
| Request Car Rental | A passenger would have the ability with a few key strokes to request a rental vehicle, usually at a pre-arranged location, e.g., at work, near home indicate whether the need was ASAP, or at a future time entered through the hand-held terminal. The anticipated length of the rental would be provided probably in units of hours. If a rental needed to be extended, probably at a higher fee, this would also be possible. |
| Notify Renter of Car to Use | A passenger would be notified of the location of a car and a very short description, e.g., blue Chevy in space 14, to use. The possible locations would typically be known in advance from the passenger's profile. E.g., at work certain locations would be numbered near the persons location of work. |
| Acknowledge Intentions | The passenger would confirm that rental was acceptable |
| Notify Car of Presence | When the person approached the car, the driver door would unlock and the car made available for operation based on the driver's personal password |
| Notify Renter of Overrun | If the car appeared to be in such a situation that the car would not be returned or dropped as planned the driver would be notified of the problem both in vehicle and on the hand-held device. |
| Notify Car of Rental End | When the rental was complete, the vehicle's computer would be notified. Note that the use of the hand-held device, eliminates a separate key in device in the vehicle. Of course, that is an option.<br>COMPUTERS FOR CAR RENTAL ASSIGNMENT |
| Find Best Car | Solves the car assignment task based on available vehicles, their locations, and their other assignments. |
| Monitor Rental Cars for Availability and Overruns | All cars are monitored for location, projected future location, in-service status, assigned renters, and actual loading by pick-up and return location. As cars are assigned this software causes notification of renters [delete both individually and in-route as to their schedule and passenger loading]. If people fail to show up or return the cars late, the loading is changed dynamically<br>COMPUTERS FOR RENTAL VEHICLES |
| Update Expected Car Use | The forward looking car reservations are stored including the identification means for the driver(s) using their hand held computer |
| Report Car Position and Use | Periodically, more frequently if in use, the car reports it detected location from GPS or cell based location and reports it's status, e.g., parked and not rented, rented. |
| Enable Ignition | Ignition and vehicle access is enabled based on the presence of the personal hand-held computer of an authorized driver. For security reasons, the authorized driver would be able to control the timing of driver door unlock and ignition actuation as if he had a normal hand held radio-based key fob. |

TABLE 1-continued

| SOFTWARE ELEMENT | FUNCTIONAL DESCRIPTION Note that several functions are performed by the SAME physical device and that computers are distributed. |
|---|---|
| Close Out Rental | The actual rental information is provided to the assignment system so that billing be correct and the car released for additional use. |
| | MISCELLANEOUS |
| Billing and Payment | Using stored data, the system would periodically, e.g., monthly bill all passengers and pay all drivers. The preferred mode would be billing to utility bill, e.g., the cell phone or pager bill. Payment to drivers would be by normal means for employed drivers and by direct credit to checking accounts for others. All of this is done without manual intervention. |

It is apparent that the present transit system has several advantages over the prior art system. One benefit of the transit system of the present invention is that it takes a passenger centric approach, wherein the system responds in a manner to passenger needs. The current system provides a combination of technologies and operating methods that work to solve the transit problem. As such, defining elements of the system include that it works with existing systems, vanpooling, carpooling, rail and bus transit, that it provides for car rental distributed though area, e.g., at work, at commercial centers, and that it has electronic automatic billing and user ID like a utility for both ride-shared and rental trips.

It is believed that no prior art system includes integrated ride-shared vehicles and car rental, which is believed essential to making a transit system succeed. Further, none allow the passenger to electronically identify himself to the system for the primary purpose of automatic billing, and also to help with security and dynamic scheduling.

While the invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. An automated system for providing unified billing for passenger transport comprising:
   (a) a central data system for tracking passenger transportation vehicle usage and distributing periodic invoices for the usage; and
   (b) a plurality of communication devices for providing wireless communication between passengers, vehicles, and the central data system in connection with the passenger transportation vehicle usage;
   wherein the vehicles comprise:
      (a) a wireless means of on-demand allocation of a passenger to a specific vehicle through the central data system;
      (b) a wireless means of informing the passenger of the assignment;
      (c) a wireless means of detecting the proximity of the passenger and alerting the passenger of the proximity of the vehicle;
      (d) a means of allowing the passenger to operate the vehicle;
      (e) a automatic means of billing for the use of the vehicle; and
      (f) a wireless vehicle locating system for tracking the vehicle.

2. An automated system for providing unified billing for passenger transport comprising:
   (a) a central data system for tracking passenger transportation vehicle usage and distributing periodic invoices for the usage; and
   (b) a plurality of communication devices for providing wireless communication between passengers, vehicles, and the central data system in connection with the passenger transportation vehicle usage; and
   (c) a wireless means of on-demand allocation of a passenger to a specific vehicle through the central data system.

3. An automated system for providing unified billing for passenger transport comprising:
   (a) a central data system for tracking passenger transportation vehicle usage and distributing periodic invoices for the usage; and
   (b) a plurality of communication devices for providing wireless communication between passengers, vehicles, and the central data system in connection with the passenger transportation vehicle usage;
   (c) a wireless means of on-demand allocation of a passenger to a specific vehicle through the central data system; and
   (d) a wireless means of informing the passenger of the assignment and updated expected arrival time.

4. An automated system for vehicles comprising:
   (a) a central data system for collecting data on subscribers to the system, the data including locations for delivery of a rental car to the subscriber, and assigning a rental car to the subscriber based on the subscriber's location needs wherein the subscriber of the rental car is informed electronically when a rental time is about to expire;
   (b) communication devices for providing wireless communications among subscribers, rental cars, and the central data system; and
   (c) a wireless means of detecting the proximity of the passenger and alerting the passenger of the proximity to rental car.

5. The automated system of claim 1, wherein the vehicles comprise rental, carpool, or mass transit vehicles.

6. An automated system for providing unified billing for passenger transport comprising:
   (a) a central data system for tracking passenger transportation vehicle usage and distributing periodic invoices for the usage; and
   (b) a plurality of communication devices for providing wireless communication between passengers, vehicles, and the central data system in connection with the passenger transportation vehicle usage; and
   (c) a wireless means of detecting the proximity of the passenger and alerting the passenger of the proximity of the vehicle.

* * * * *